United States Patent
Lueck (10) Patent No.: US 9,470,265 B2
(45) Date of Patent: Oct. 18, 2016

(54) SLIDE BEARING DEVICE

(71) Applicant: Rolls-Royce Deutschland Ltd & Co KG, Blankenfelde-Mahlow (DE)

(72) Inventor: Rudolf Lueck, Nuthetal-Rehbruecke (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 0 days.

(21) Appl. No.: 14/812,600

(22) Filed: Jul. 29, 2015

(65) Prior Publication Data
US 2016/0032968 A1    Feb. 4, 2016

(30) Foreign Application Priority Data
Jul. 31, 2014 (DE) .................. 10 2014 110 907

(51) Int. Cl.
*F16C 23/04* (2006.01)
*F16C 32/06* (2006.01)
(Continued)

(52) U.S. Cl.
CPC .......... *F16C 32/0633* (2013.01); *F16C 17/02* (2013.01); *F16C 17/18* (2013.01);
(Continued)

(58) Field of Classification Search
CPC ...... F16C 17/02; F16C 17/18; F16C 23/043; F16C 23/045; F16C 23/046; F16C 32/0633; F16C 32/0688; F16C 33/043; F16C 33/046
USPC ........ 384/108, 109, 192, 212, 286, 297, 322
See application file for complete search history.

(56) References Cited

U.S. PATENT DOCUMENTS 2,596,202 A * 5/1952 Bolte .................. F16C 11/0614
                                                    384/212
3,544,177 A    12/1970 Tallian et al.
(Continued)

FOREIGN PATENT DOCUMENTS

DE    1913365 U    9/1970
DE    2837938 A1    3/1980
(Continued)

OTHER PUBLICATIONS

European Search Report dated Oct. 9, 2015 for counterpart European Application No. 15178562.3.
(Continued)

*Primary Examiner* — Phillip A Johnson
(74) *Attorney, Agent, or Firm* — SHUTTLEWORTH & INGERSOLL, PLC; Timothy J. Klima (57) ABSTRACT

A slide bearing device, includes an inner ring-shaped internal element, an intermediate element that encloses the internal element in the radial direction of the slide bearing device and is at least approximately ring-shaped, and a ring-shaped external element that encloses the intermediate element in the radial direction. The internal element is rotatable relative to the external element, and the intermediate element is rotatable relative to the internal element and relative to the external element. In a default state of the slide bearing device, the internal element is arranged at a distance to the intermediate element in the radial direction of the slide bearing device, and the intermediate element is arranged at a distance to the external element. The internal element and the external element are made of a metallic material and the intermediate element with a non-metallic material.

19 Claims, 4 Drawing Sheets

(51) Int. Cl.
  *F16C 17/18* (2006.01)
  *F16C 33/04* (2006.01)
  *F16C 17/02* (2006.01)
  *F16C 17/22* (2006.01)
  *F16C 33/10* (2006.01)

(52) U.S. Cl.
  CPC ......... *F16C32/0688* (2013.01); *F16C 33/043* (2013.01); *F16C 17/22* (2013.01); *F16C 33/046* (2013.01); *F16C 33/1025* (2013.01); *F16C 33/1075* (2013.01)

(56) References Cited

U.S. PATENT DOCUMENTS

| | | | |
|---|---|---|---|
| 3,920,293 A | 11/1975 | Takeuchi | |
| 4,099,801 A * | 7/1978 | Korrenn | C21C 5/464 384/116 |
| 4,204,718 A * | 5/1980 | Bosco | F16C 17/18 384/286 |
| 4,318,572 A * | 3/1982 | Noha | F16C 11/0614 384/108 |
| 4,410,285 A | 10/1983 | Strasser et al. | |
| 5,219,231 A | 6/1993 | Sheedy | |
| 5,820,270 A | 10/1998 | Richardson | |
| 8,075,190 B1 * | 12/2011 | Wadehn | F16C 32/0685 384/100 |
| 8,616,772 B1 | 12/2013 | Kellar et al. | |
| 2004/0022464 A1 * | 2/2004 | Schinazi | F16C 23/045 384/192 |

FOREIGN PATENT DOCUMENTS

| | | |
|---|---|---|
| DE | 3635837 | 4/1988 |
| DE | 20 2007 000 609 | 5/2008 |
| DE | 10 2011 121 562 | 6/2013 |
| DE | 10 2012 202 341 | 8/2013 |
| FR | 915604 A | 11/1946 |
| FR | 961631 A | 5/1950 |
| GB | 1174628 A | 12/1969 |
| WO | WO9522011 A1 | 8/1995 |

OTHER PUBLICATIONS

German Search Report dated Mar. 20, 2015 from counterpart App No. 10 2014 110 907.4.

* cited by examiner

SLIDE BEARING DEVICE

This application claims priority to German Patent Application 102014110907.4 filed Jul. 31, 2014, the entirety of which is incorporated by reference herein.

The invention relates to a slide bearing device, comprising a ring-shaped internal element, a ring-shaped intermediate element as well as a ring-shaped external element of the kind as defined in more detail herein.

Hydrodynamic slide bearing devices are used in planet gear sets to mount the planetary gears of the planet gear set on a planetary carrier, for example. Such slide bearing devices have an inner ring and an outer ring, which are rotatable relative to each other, wherein during operation of the planet gear set differences in the rotational speeds e.g. in a range of 3,000 revolutions per minute up to 4,000 revolutions per minute may occur between the inner ring and the outer ring.

In such slide bearing devices there is the danger that the inner ring which is made of metal and the outer ring which is also made of metal come into abutment. Due to such a contact between the inner ring and the outer ring, local micro-weldings may occur between the inner ring and the outer ring of the slide bearing device. In particular during an approach movement of the slide bearing device, as an increase of the relative velocity of the inner ring occurs in comparison to the outer ring of the slide bearing device, these micro-weldings are released again, with the inner ring and the outer ring becoming subject to attrition and the service life of the slide bearing device being reduced by an undesired degree due to this process.

From DE 10 201 2 202 341 A1, a radial bearing for an exhaust-driven turbocharger is known. The radial bearing is embodied as an oil-flushed floating bushing bearing, wherein a rotatable floating bushing is arranged between an inner rotating shaft and an outer bearing housing as seen in the radial direction, wherein a lubrication gap between the bearing housing and the floating bushing as well as a lubrication gap between the floating bushing and the shaft are filled with lubricating oil. During operation, the floating bushing bearing operates at speeds of up to 300,000 revolutions per minute, during which instability in the axis position of the bearing may occur due to turbulences in the oil layers.

Since the elements of the floating bushing bearing, i.e. the shaft, the bearing housing and the floating bushing, are usually also made of metallic materials, in such an embodiment it may principally also result in contact between the elements of the floating bushing bearing, i.e. between the shaft and the floating bushing or between the floating bushing and the bearing housing, during an approach movement. Here, micro-weldings may occur in the area of the elements of the floating bushing bearing which are subsequently released when there is an increase in relative velocity. This process may in turn lead to an undesired degree of wear including the corresponding disadvantages with regard to the service life of the floating bushing bearing.

The present invention is based on the objective to provide a slide bearing device in which a prolonged service life as compared to known slide bearing devices can be achieved in a simple manner.

According to the invention, this objective is solved by a slide bearing device with features as described herein.

What is proposed is a slide bearing device comprising an inner ring-shaped internal element, at least one intermediate element which is enclosing the internal element in the radial direction of the slide bearing device and has an at least approximately ring-shaped form, and at least one ring-shaped external element that is enclosing the intermediate element in the radial direction of the slide bearing device, wherein the internal element is rotatable relative to the external element, and the at least one intermediate element is rotatable relative to the internal element and relative to the external element, and wherein in a default state of the slide bearing device the internal element is arranged at a distance to the at least one intermediate element, and the at least one intermediate element is arranged at a distance to the external element in the radial direction of the slide bearing device.

It is provided according to the invention that the internal element and the external element are made of a metallic material and the at least one intermediate element is made of a non-metallic material.

The slide bearing device according to the invention has the advantage that an abrasion in the area of the slide bearing device is strongly reduced in a constructionally simple manner as compared to known slide bearing devices. This advantage is based on the fact that between the metallic internal element and the metallic external element, which are made of steel, for example, and the at least one non-metallic intermediate element or inlay no micro-weldings occur or occur to a strongly reduced degree as compared to known embodiments, and thus abrasion is strongly reduced as compared to known embodiments.

In addition, through providing the ring-shaped intermediate element, the slide bearing device according to the invention facilitates an enhanced compensation for any tilting between an axis of the internal element and an axis of the external element during operation of the slide bearing device as compared to conventional known slide bearing devices that have only an inner ring and an outer ring. At that, the slide bearing device according to the invention advantageously has a sturdiness that is comparable to these slide bearing devices, whereas gliding abrasion of the slide bearing device according to the invention is considerably reduced as compared to the known slide bearing devices.

Micro-weldings between the internal element or the external element and the intermediate element can be reduced or completely prevented in a particularly effective manner when the intermediate element is made of a ceramic material.

In particular, the internal element, the external element and the at least one intermediate element have a substantially cylindrical base body.

In a very robust and long-life slide bearing device according to the invention it is provided that a distance between the intermediate element and the internal element, and a distance between the intermediate element and the external element in the radial direction of the slide bearing device is chosen in such a manner that in the area of the at least one intermediate element the tensile strains occurring during operation of the slide bearing device lie below a defined threshold value. In this way, any damage to the slide bearing device during operation can be avoided in a particularly sure manner even at rising operating temperatures of the slide bearing device. In this manner, differing expansion tendencies of the internal element, the intermediate element and the external element are taken into account by means of the constructional embodiment of the slide bearing device according to the invention. This means that a metallic internal element, which expands more strongly at rising operating temperatures than the ceramic intermediate element, does not create any tensile strains that compromise the functionality of the intermediate element at rising operating temperatures in the intermediate element.

When a surface of the at least one intermediate element that is facing towards an internal element, and preferably one surface of the internal element that is facing towards the intermediate element, and/or a surface of the at least one intermediate element that is facing towards the external element, and preferably one surface of the external element that is facing towards the intermediate element, as seen in the direction of the central axis of the slide bearing device, is or are embodied preferably in such a manner as to be curved correspondingly to each other, any larger degree of tilting of the internal element can be compensated for with regard to an external element in a simple and low-wear manner.

In an advantageous embodiment of a slide bearing device according to the invention it is provided that the external surface of the internal element, the internal surface of the intermediate element, the external surface of the intermediate element and/or the internal surface of the external element, as seen in the longitudinal section with respect to the central axis of the slide bearing device, have a constant radius of curvature. In particular when the interacting surfaces of the internal element, the intermediate element and/or the external element in the longitudinal section view of the slide bearing device are part of a circle, wherein the radius of the surfaces of the internal element and the intermediate element or the intermediate element and the external element that are facing each other, respectively, can differ from one another, any tilting of a central axis of the internal element with respect to the central axis of the external element can be compensated for effectively and also in a wear-free manner. Here, the surfaces in particular correspond to a section of a radially external surface of a torus.

Here, the surfaces of the internal element, the external element and the intermediate element are in particular embodied so as to be respectively mirror-symmetric to a middle cross-section plane of the slide bearing device. The intermediate element can be formed spherically in the area of its surface that is facing towards the internal element and/or in the area of its surface that is facing towards the external element.

In an advantageous embodiment of the invention the intermediate element is embodied as a multi-piece part in the circumferential direction of the slide bearing device, particularly in order to be also able to mount a slide bearing device that comprises an internal element, an external element and/or an intermediate element with curved surfaces in a simple manner. The more parts the intermediate element has, in particular parts that are embodied identically and that extend across a substantially comparable circumferential area of the slide bearing device, the easier the slide bearing device can be mounted. As an alternative it can also be provided that the distances between the internal element and the external element are dimensioned in such a manner that mounting is facilitated by heating and/or cooling the internal element, the external element and/or the intermediate element.

In an advantageous further development of the slide bearing device according to the invention, respectively one dividing element is provided in the circumferential direction of the slide bearing device between respectively two parts of the intermediate element. In a slide bearing device of this embodiment, for the purpose of mounting the slide bearing device, in particular first the parts of the intermediate element are inserted between the internal element and the external element and made to abut each other with their frontal surfaces in the circumferential direction of the slide bearing device so that all parts of the intermediate element can be inserted between the internal element and the external element in an easy manner. Subsequently, respectively one dividing element that is embodied as a spacer and in particular is formed with an elastic material can be inserted between respectively adjacent parts of the intermediate element in the circumferential direction of the slide bearing device.

In particular in order to also be able to mount a slide bearing device with curved, facing surfaces of the intermediate element and of the external element in a simple manner, the external element can be embodied in at least two parts in the axial direction of the slide bearing device, wherein the parts of the external element are connected to each other during mounting of the slide bearing device. For this purpose, the parts of the external element can be connected to each other for example through a welded joint, a screw connection, a rivet connection or the like.

The slide bearing device according to the invention is preferably embodied as a hydrodynamic or hydrostatic slide bearing device, wherein a hydraulic fluid is arranged in a space present in the radial direction of the slide bearing device between the internal element and the external element. In particular during hydrodynamic operation of the slide bearing device, the intermediate element is completely surrounded by hydraulic fluid and mounted in a floating manner between the internal element and the external element. The distances between the surfaces of the internal element and the intermediate element, or between the surfaces of the external element and the intermediate element are preferably dimensioned in such a manner that tensile strains in the area of the intermediate element are surely prevented and only compressive stresses are acting on the intermediate element during operation of the slide bearing devices. Hereby the danger of any damage is rendered very small, in particular when it comes to an intermediate element that is made of ceramic material. In addition, the danger of any undesired degree of abrasion of the slide bearing device in case of deficient lubrication is strongly reduced as compared to known slide bearing devices which comprise only an inner ring and an outer ring.

In an advantageous embodiment of the invention, a closed hydraulic fluid space for the intermediate element is created through preferably plate-shaped lateral elements, which can for example be fixedly connected to the internal element or the external element, wherein a sealing device can be provided between the external element or the internal element and the lateral element.

The slide bearing device according to the invention can be used in planet gear sets, for example, to support planetary gears opposite a planetary carrier. Since any tilting of the axes of the elements can be compensated for in a particularly efficient manner with the slide bearing device according to the invention, a one-sided mounting of the planets, in which a larger degree of tilting may occur, is also possible.

The slide bearing device is preferably embodied as a high-load slide bearing device, carrying out revolutions of up to approximately 10,000 revolutions per minute during operation, preferably in the range of 3,000 revolutions per minute to 4,000 revolutions per minute.

The features described in the patent claim as well as the features described in the following exemplary embodiments of the slide bearing device according to the invention are suitable for further developing the subject matter according to the invention respectively individually or in any combination with each other.

Further advantages and advantageous embodiments of the slide bearing device according to the invention follow from the patent claims and the exemplary embodiments that are principally described in the following with reference to the drawings, wherein with a view to clarity the same reference signs are respectively used for structural components that have the same design and functionality.

Herein.

Figure 1:
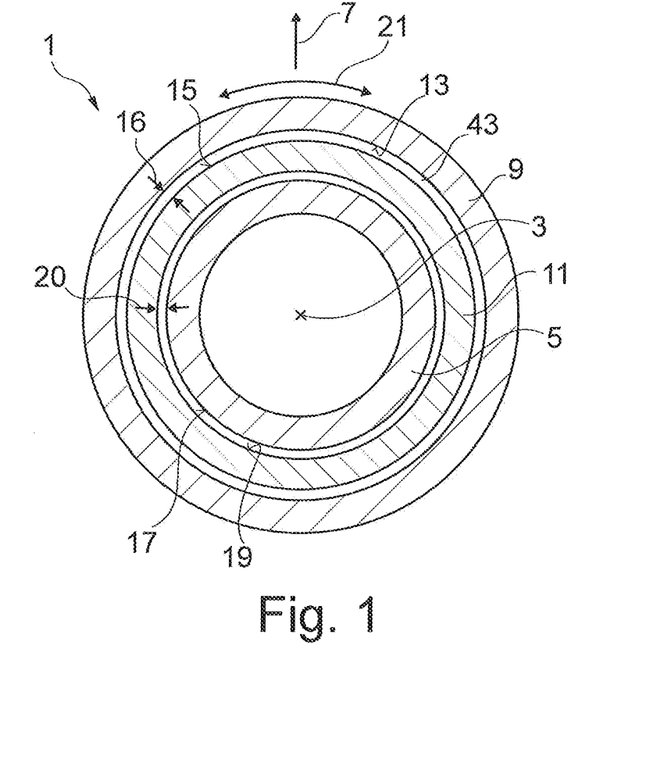
FIG. 1 shows a strongly schematized cross-sectional view of a slide bearing device according to the invention with an internal element, an external element and an intermediate element arranged in the radial direction of the slide bearing device between the internal element and the external element.

FIG. 1 shows a strongly simplified cross-sectional view of an in particular hydrodynamic slide bearing device 1 relative to a central axis 3 of the slide bearing device 1 in a default state. Here, it can be seen that the slide bearing device 1 that is embodied as a high-load slide bearing device comprises an inner ring-shaped internal element 5 or inner ring with regard to the central axis 3 of the slide bearing device 1, and an external element 9 or outer ring that is enclosing the internal element 5 on the outside with regard to a radial direction 7 of the slide bearing device 1 and that is also ring-shaped.

An intermediate element 11, which is also ring-shaped here, is arranged between the internal element 5 and the external element 9 in the radial direction 7 of the slide bearing device 1, wherein the internal element 5, the external element 9 and the intermediate element 11 respectively have a base body that is substantially cylindrical or cylindrical in certain sections. What is meant here by a default state of the slide bearing device 1 is a state in which the central axes of the internal element 5, the external element 9 and the intermediate element 11 coincide with the central axis 3 of the slide bearing device 1, and in particular that the slide bearing device 1 is in a load-free state.

Figure 2:
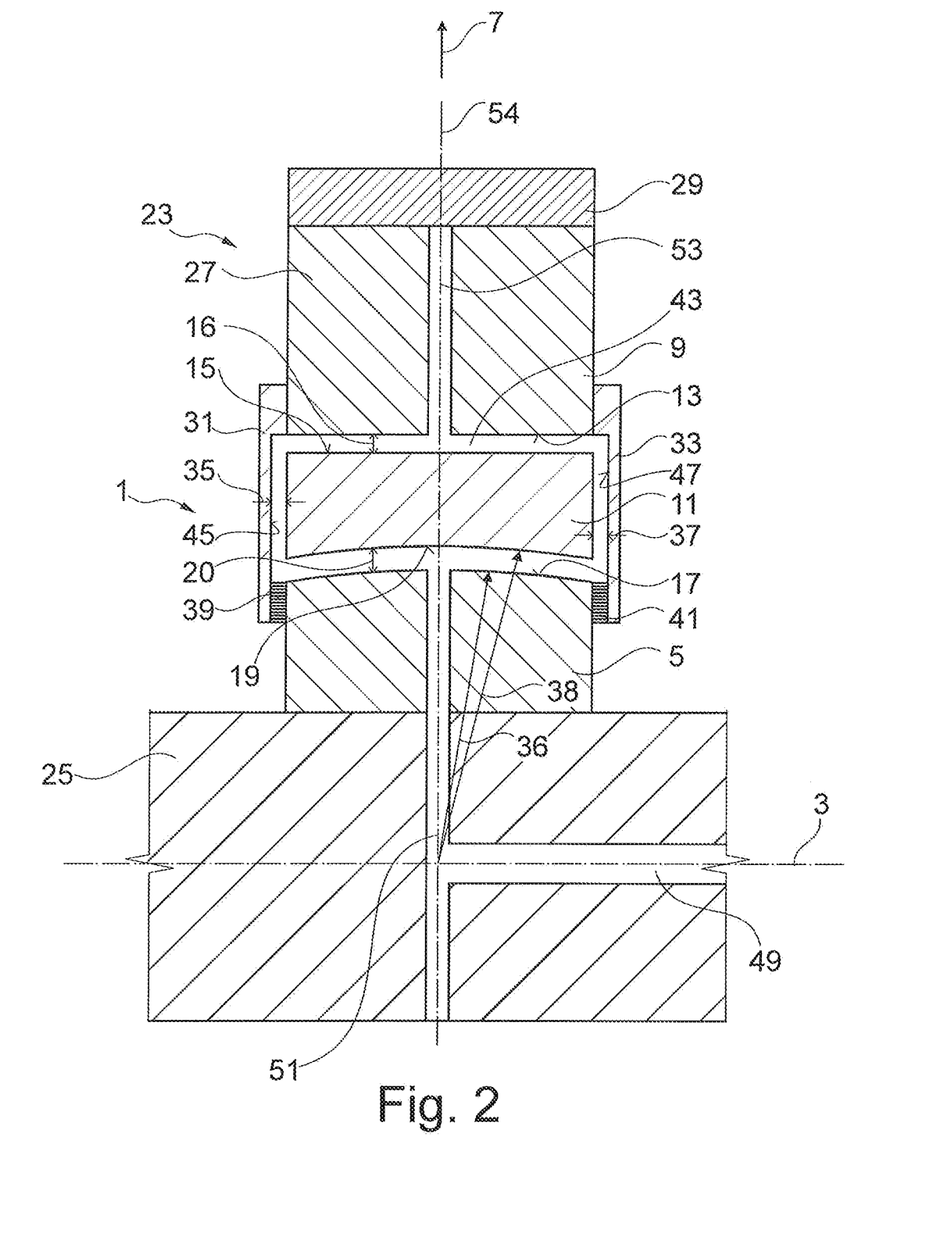
FIG. 2 shows a strongly simplified longitudinal section view of the slide bearing device of FIG. 1 for mounting a planet gear opposite a planetary carrier of a planet gear set of which sections are shown.

In FIG. 2 a longitudinal section view of the slide bearing device 1 with regard to the central axis 3 can be seen in the installed state of the slide bearing device 1. Here, the slide bearing device 1 is shown in the area of a planet gear set 23 of which only sections are shown, wherein the internal element 5 of the slide bearing device 1 is connected in a torque-proof manner to a planetary carrier 25 of the planet gear set 23, and the external element 9 of the slide bearing device 1 is connected in a torque-proof manner to a planet gear 27 of the planet gear set 23 or is embodied integral with the same. In turn, the planet gear 27 acts together via a gearing 29, for example a double helical gearing, with a ring gear of the planet gear set 23 that is not shown in any more detail.

As can be seen in FIG. 2, the slide bearing device 1 comprises two ring-disc-shaped lateral limiting elements 31, 33, which in the present case are respectively fixedly connected to the external element 9 and extend in the radial direction 7 of the slide bearing device 1 from an area of the external element 9 to the area of the internal element 5. As seen from the direction of the central axis 3, the lateral limiting elements 31, 33 enclose the intermediate element 11 of the slide bearing device 1 in between them.

During operation of the hydrodynamic slide bearing device 1, the intermediate element 11 is mounted in a floating manner in a hydraulic fluid, in particular in oil, which is arranged in the slide bearing device 1 in a space 43. The space 43 is formed by the external surface 17 of the internal element 5, the internal surface 13 of the external element 9 and the surfaces 45, 47 of the lateral limiting elements 31, 33 that are facing towards the intermediate element 11. In order to seal the space 43 against an environment, respectively one sealing device 39, 41 is provided between the respective lateral limiting element 31, 33 and the internal element 5.

In the load-free default state of the slide bearing device 1, which can be seen in FIGS. 1 and 2, the intermediate element 11 is arranged at a distance to the external surface 17 of the internal element 5, the internal surface 13 of the external element 9 as well as to the surfaces 45, 47 of the lateral limiting elements 31, 33, so that the intermediate element 11 does not come into contact with the respective surfaces 13, 17, 45, 47.

The intermediate element 11 is arranged completely within space 43, wherein between an internal surface 13 of the external element 9 that is facing towards an intermediate element 11 and an external surface 15 of the intermediate element 11 that is facing towards the external element 9 a distance 16 is present in the unstressed state of the slide bearing device 1, which is substantially constant in the non-operating state of the slide bearing device 1 in the circumferential direction 21 of the slide bearing device 1 and in the direction of the central axis 3 of the slide bearing device 1. Likewise, a distance 20 that is provided between an external surface 17 of the internal element 5 that is facing towards the intermediate element 11 and the internal surface 19 of the intermediate element 11 that is facing towards the internal element 5 is substantially constant in the non-operating state of the slide bearing device 1 in the circumferential direction 21 of the slide bearing device 1 and in the direction of the central axis 3 of the slide bearing device 1 and approximately corresponds to the distance 16 here. Also in the direction of the central axis 3 of the slide bearing device 1 a distance 35, 37 is respectively provided between the respective lateral limiting element 31, 33 and the intermediate element 11 that is substantially constant in the unstressed state of the slide bearing device 1 in the radial direction 7 of the slide bearing device 1.

The internal element 5 and the external element 9 consist of a metallic material here, for example of steel, whereas the intermediate element 11 in the present case is made of a ceramic material. Through the floating mounting of the intermediate element 11 and a corresponding choice of the distances 16, 20 it is avoided in a sure manner that tensile strains exceeding a defined threshold value act on the intermediate element 11 during operation of the slide bearing device 1, which may lead to damage to the intermediate element 11 which is made of a ceramic material. During operation of the slide bearing device 1, preferably only compressive stresses act on the intermediate element 11.

In the present case, space 43 can be supplied with oil or hydraulic fluid via oil or hydraulic lines 49, 51, wherein oil can be supplied to the space 43 via an oil line 49 that extends in the direction of the central axis 3 of the slide bearing device 1 in the area of the planetary carrier 25 and that leads into an oil line 51 that extends in the radial direction 7 of the slide bearing device 1 through the planetary carrier 25 and the internal element 5. Oil that is present in the space 43 can be discharged by means of an additional oil line 53 in the radial direction 7 of the slide bearing device 1 through the external element 9 and the planet gear 27 outwards in the direction of the gearing 29.

As can be seen in FIG. 2, the external surface 17 of the internal element 5 as well as the internal surface 19 of the intermediate element 11 are curved or bent, wherein respectively areas of the surfaces 17, 19 that are facing a lateral limiting element 31, 33 have a shorter distance to the central axis 3 of the slide bearing device 1 than an area of the surfaces 17, 19 that is central with regard to the lateral limiting elements 31, 33. In FIG. 2, the surfaces 17, 19 shown in the sectional view are respectively part of a circular surface that has a center point which in particular lies on the central axis 3 of the slide bearing device 1, wherein the radius 36 that belongs to the external surface 17 of the internal element 5 is smaller than a radius 38 that belongs to the internal surface 19 of the intermediate element 11. In addition, in the present case the surfaces 17, 19 are embodied so as to be symmetrical to a middle cross-section plane 54 of the slide bearing device 1, in which the oil lines 51 and 53 are also located in the present case.

In the present case, the external surface 15 of the intermediate element 11 and the internal surface 13 of the external element 9 are part of a cylinder surface that has a central axis that corresponds to the central axis 3 of the slide bearing device 1 in the default state of the slide bearing device. However, alternatively or additionally, the surfaces 13, 15 can be embodied in a curved or bent manner that is comparable to surfaces 17, 19.

Here, the curvature of the surfaces 17, 19 and the distances 16, 20 are also adapted to each other in such a manner that the intermediate element 11 that is embodied as a single piece can be inserted in a simple manner between the internal element 5 and the external element 9 for the purpose of mounting the slide bearing device 1.

During operation of the slide bearing device 1 it may happen due to the loads that are present that an axis of the planet gear 27 and an axis of the planetary carrier 25, which in the shown embodiment coincide with the central axis 3 of the slide bearing device 1, are in a tilted position with respect to one another. Through the bent embodiment of the surfaces 17, 19, such a tilting of the internal element 5 with respect to the external element 9 can be compensated for in a very efficient manner.

The shown robust slide bearing device 1 is exemplarily designed for revolutions in the range of 3,000 revolutions per minute to 4,000 revolutions per minute, for example, wherein the degree of gliding abrasion in the area of the slide bearing device 1 is very small. This results from the fact that so-called micro-welding, which may be present in conventional slide bearing devices at the beginning of a rotary motion of the slide bearing device due to brief metal on metal contact, is avoided through the slide bearing device 1 according to the invention in a sure manner by providing an intermediate element 11 which in the present case is formed of a ceramic material. In addition the danger of any strong abrasion in the area of the slide bearing device 1 due to deficient lubrication is strongly reduced as compared to known embodiments.

Figure 3:
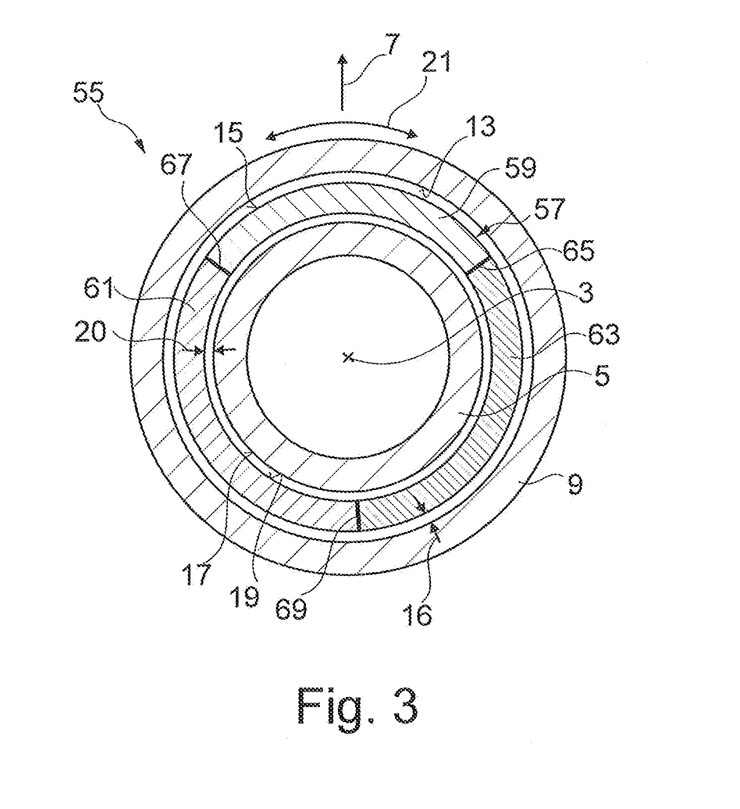
FIG. 3 shows a strongly simplified cross-sectional view of an alternatively embodied slide bearing device, comprising an intermediate element that is formed as a multi-piece part.

In FIG. 3, a slide bearing device 55 is shown, which substantially corresponds to slide bearing device 1. In contrast to the slide bearing device 1, an intermediate element 57 of the slide bearing device 55 is embodied not as a single piece, but as a multi-piece part in the circumferential direction 21 of the slide bearing device 55. In the present case, the intermediate element 57 has three parts 59, 61, 63 that are substantially identical structurally, wherein in an alternative embodiment of the invention also a different number of parts, in particular multiple parts, can be provided.

For mounting the slide bearing device 55, the parts 59, 61, 63 are first inserted into the space 43 between the internal element 5 and the external element 9. When during this process the parts 59, 61, 63 are respectively brought in abutment to each other in the circumferential direction 21 of the slide bearing device 55, in particular an insertion of the last part 59, 61 or 63 of the intermediate element 57 is possible in a particularly simple manner. Subsequently, dividing elements that are respectively embodied as spacers 65, 67, 69 are inserted between the adjacent parts 59, 61, 63 of the intermediate element 57. In the mounted state of the slide bearing device 55, the spacers 65, 67, 69 and the parts 59, 61, 63 of the intermediate element 57 are arranged so as to be evenly distributed across the circumference of the slide bearing device 55.

Figure 4:
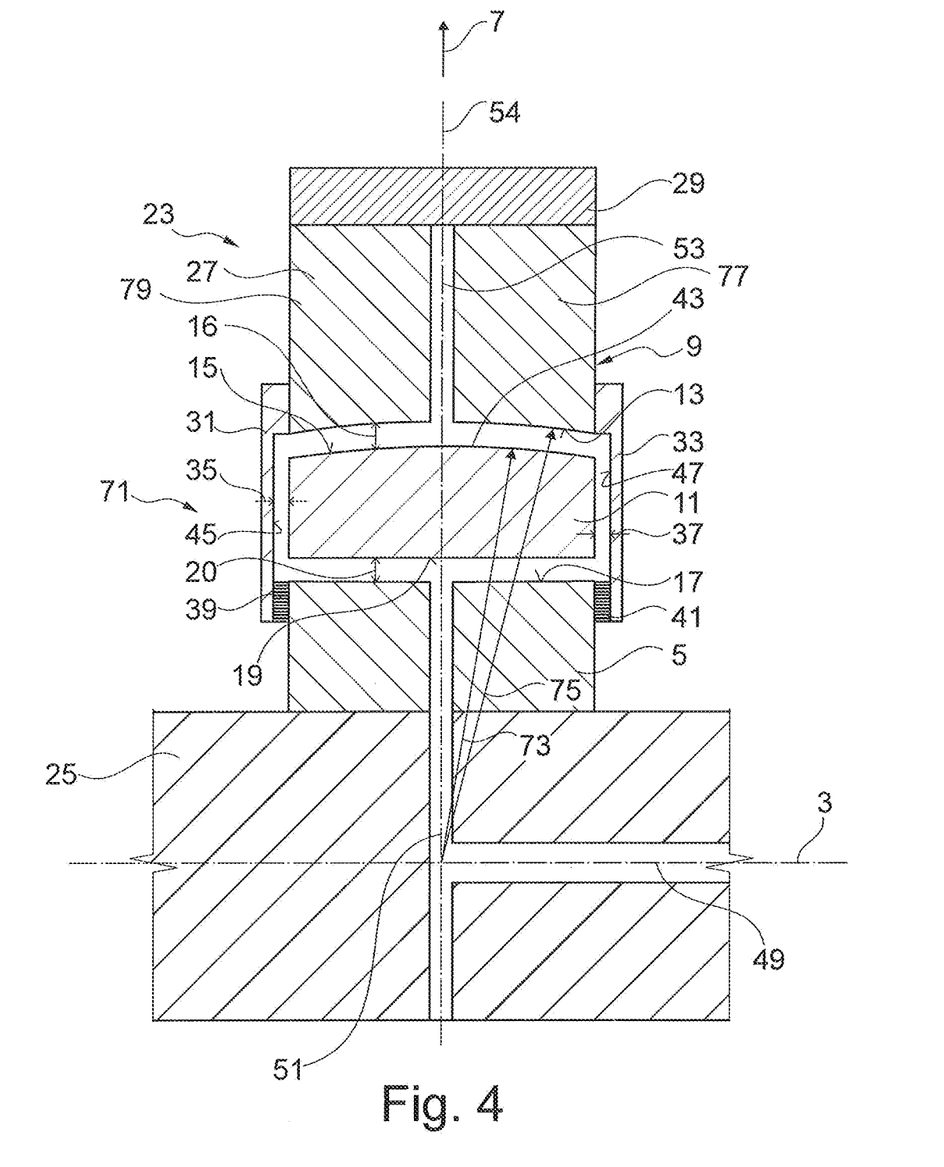
FIG. 4 shows a strongly simplified longitudinal section view of another slide bearing device in an alternative embodiment, comprising an external element that is embodied as a multi-piece part.

In FIG. 4 another slide bearing device 71 is shown, which substantially corresponds to the slide bearing device 1, so that hereafter only the differences between these embodiments are discussed.

In the slide bearing device 71, the external surface 17 of the internal element 5 as well as the internal surface 19 of the intermediate element 11 are part of a cylinder surface, which has a central axis that corresponds to the central axis 3 of the slide bearing device 71 in the default state of the slide bearing device 71.

In contrast, the surfaces 13, 15 of the external element 9 or of the intermediate element 11 are curved or bent, wherein the areas of the surfaces 13, 15 that are respectively facing towards the lateral limiting element 31, 33 have a shorter distance to a central axis 3 of the slide bearing device 71 than an area of the surfaces 13, 15 which is central with regard to the lateral limiting elements 31, 33. In the sectional view shown in FIG. 4, the surfaces 13, 15 are respectively part of a circular surface, that in particular has a center point that lies on the central axis 3 of the slide bearing device 1. Here, a radius 73 that belongs to the external surface 15 of the intermediate element 11 is smaller than the radius 75 that belongs to the internal surface 13 of the external element 9, wherein the surfaces 13, 15 are embodied so as to be symmetrical to the middle cross-section plane 54 of the slide bearing device 71.

Alternatively or additionally, the surfaces 17, 19 can in turn also be embodied so as to be curved or bent corresponding to one another in a manner comparable to the surfaces 17, 19.

For easy mounting of the slide bearing device 71, the external element 9 in the present case is embodied in two parts in the axial direction of the slide bearing device 71 and has a first part 77 and a second part 79. In the present case, the parts 77, 79 of the external element 9 have an approximately identical length in the axial direction of the slide bearing device 71 and are arranged around the intermediate element 11 from opposite sides as seen in the axial direction during the mounting of the slide bearing device 71. In the present case, the parts 77, 79 of the external element 9 are connected to each other via a welded joint, but can alternatively or in addition also be connected to each other via a screw connection, a rivet connection or the like.

Through the bent embodiment of the surfaces 13, 15 a tilting of the internal element 5 with respect to the external element 9 can be compensated for in a manner analogous to the description in the exemplary embodiment.

PARTS LIST 1 slide bearing device
3 central axis of the slide bearing device
5 internal element of the slide bearing device
7 radial direction of the slide bearing device
9 external element of the slide bearing device
11 intermediate element of the slide bearing device
13 internal surface of the external element
15 external surface of the intermediate element
16 distance
17 external surface of the internal element
19 internal surface of the intermediate element
20 distance
21 circumferential direction of the slide bearing device
23 planet gear set
25 planetary carrier
27 planet gear
29 gearing of the planet gear
31 lateral limiting element of the slide bearing device
33 lateral limiting element of the slide bearing device
35 distance
36 radius
37 distance
38 radius
39 sealing device
41 sealing device
43 space
45 surface of the lateral limiting elements
47 surface of the lateral limiting elements
49 oil line
51 oil line
53 oil line
54 cross section center plane of the slide bearing device
55 slide bearing device
57 intermediate element of the slide bearing device
59, 61, 63 parts of the intermediate element
65, 67, 69 spacer; dividing elements of the intermediate element
71 slide bearing device
73 radius
75 radius
77 part of the external element
79 part of the external element

The invention claimed is:

1. A slide bearing device comprising an inner ring-shaped internal element, at least one intermediate element that encloses the internal element in a radial direction of the slide bearing device and that is embodied so as to be at least approximately ring-shaped, and a ring-shaped external element that encloses the at least one intermediate element in the radial direction of the slide bearing device, wherein the internal element is rotatable relative to the external element, and the at least one intermediate element is rotatable relative to the internal element and relative to the external element, and wherein in a default state of the slide bearing device the internal element is arranged at a distance to the at least one intermediate element in the radial direction of the slide bearing device, and the at least one intermediate element is arranged at a distance to the external element, wherein the internal element and the external element are made of a metallic material and the at least one intermediate element is made of a non-metallic material.

2. The slide bearing device according to claim 1, wherein the at least one intermediate element is made of a ceramic material.

3. The slide bearing device according to claim 2, wherein a distance between the at least one intermediate element and the internal element and a distance between the at least one intermediate element and the external element in the radial direction of the slide bearing device are chosen such that tensile strains lie below a defined threshold value in an area of the at least one intermediate element during operation of the slide bearing device.

4. The slide bearing device according to claim 3, wherein an internal surface of the at least one intermediate element that is facing the internal element and an external surface of the internal element that is facing the at least one intermediate element are embodied so as to be curved as seen in a direction of a central axis of the slide bearing device.

5. The slide bearing device according to claim 4, wherein an external surface of the at least one intermediate element that is facing towards the external element and an internal surface of the external element that is facing towards the at least one intermediate element are embodied so as to be curved as seen in a direction of a central axis of the slide bearing device.

6. The slide bearing device according to claim 5, wherein at least one chosen from the external surface of the internal element, the internal surface of the at least one intermediate element, the external surface of the at least one intermediate element and the internal surface of the external element have a constant radius of curvature.

7. The slide bearing device according to claim 6, wherein the at least one intermediate element is embodied as a multi-piece part in a circumferential direction of the slide bearing device.

8. The slide bearing device according to claim 7, wherein respectively one dividing element is provided in the circumferential direction of the slide bearing device between two parts of the at least one intermediate element, respectively.

9. The slide bearing device according to claim 8, wherein the external element is embodied in at least two parts in an axial direction of the slide bearing device.

10. The slide bearing device according to claim 9, wherein a hydraulic fluid is arranged in a space present in the radial direction of the slide bearing device between the internal element and the external element.

11. The slide bearing device according to claim 1, wherein the at least one intermediate element is embodied as a multi-piece part in a circumferential direction of the slide bearing device.

12. The slide bearing device according to claim 11, wherein respectively one dividing element is provided in the circumferential direction of the slide bearing device between two parts of the at least one intermediate element, respectively.

13. The slide bearing device according to claim 1, wherein the external element is embodied in at least two parts in an axial direction of the slide bearing device.

14. The slide bearing device according to claim 1, wherein a hydraulic fluid is arranged in a space present in the radial direction of the slide bearing device between the internal element and the external element.

15. The slide bearing device according to claim 1, wherein an external surface of the at least one intermediate element that is facing towards the external element and an internal surface of the external element that is facing towards the at least one intermediate element are embodied so as to be curved as seen in a direction of a central axis of the slide bearing device.

16. The slide bearing device according to claim 15, wherein at least one chosen from an external surface of the internal element, an internal surface of the at least one intermediate element, the external surface of the at least one intermediate element and the internal surface of the external element have a constant radius of curvature.

17. The slide bearing device according to claim 1, wherein a distance between the at least one intermediate element and the internal element and a distance between the at least one intermediate element and the external element in the radial direction of the slide bearing device are chosen such that tensile strains lie below a defined threshold value in an area of the at least one intermediate element during operation of the slide bearing device.

18. The slide bearing device according to claim 17, wherein an internal surface of the at least one intermediate element that is facing the internal element and an external surface of the internal element that is facing the at least one intermediate element are embodied so as to be curved as seen in a direction of a central axis of the slide bearing device.

19. The slide bearing device according to claim 1, wherein an internal surface of the at least one intermediate element that is facing the internal element and an external surface of the internal element that is facing the at least one intermediate element are embodied so as to be curved as seen in a direction of a central axis of the slide bearing device.

* * * * *